(12) United States Patent
Tallamy et al.

(10) Patent No.: US 12,197,488 B2
(45) Date of Patent: Jan. 14, 2025

(54) CENTRALIZED UNIVERSAL MEDIA OBJECT MANAGEMENT

(71) Applicant: EDITSHARE, LLC, Watertown, MA (US)

(72) Inventors: Stephen Charles Tallamy, Sandhurst (GB); William David Scaife Cook, Perth and Kinross (GB)

(73) Assignee: EDITSHARE, LLC, Watertown, MA (US)

( * ) Notice: Subject to any disclaimer, the term of this patent is extended or adjusted under 35 U.S.C. 154(b) by 45 days.

(21) Appl. No.: 17/830,801

(22) Filed: Jun. 2, 2022

(65) Prior Publication Data

US 2022/0391430 A1 Dec. 8, 2022

Related U.S. Application Data

(60) Provisional application No. 63/195,815, filed on Jun. 2, 2021.

(51) Int. Cl.
*G06F 16/41* (2019.01)
*G11B 27/031* (2006.01)

(52) U.S. Cl.
CPC ............ *G06F 16/41* (2019.01); *G11B 27/031* (2013.01)

(58) Field of Classification Search
CPC ....................................................... G06F 16/41
See application file for complete search history.

(56) References Cited

U.S. PATENT DOCUMENTS

| 7,761,574 | B2 | 7/2010 | Liebman |
| 8,266,283 | B2 | 9/2012 | Liebman |
| 8,751,604 | B2 | 6/2014 | Liebman |
| 9,076,488 | B2 | 7/2015 | Liebman |
| 9,552,843 | B2 | 1/2017 | Liebman |
| 9,626,375 | B2 | 4/2017 | Liebman |
| 2017/0286096 | A1 | 10/2017 | Mathur et al. |
| 2019/0250800 | A1 | 8/2019 | Coldham et al. |
| 2020/0012764 | A1 | 1/2020 | Thomee et al. |
| 2021/0337042 | A1 | 10/2021 | Tallamy et al. |

FOREIGN PATENT DOCUMENTS

WO 2013034922 A2 3/2013

OTHER PUBLICATIONS

International Search Report and Written Opinion from corresponding International Application No. PCT/US2022/031959 dated Oct. 11, 2022.
Extended European Search Report from corresponding European Application No. 22816853.0 dated Dec. 2, 2024.

*Primary Examiner* — Kristopher Andersen
(74) *Attorney, Agent, or Firm* — Lando & Anastasi, LLP (57) ABSTRACT

Techniques are described for a computing system to synchronize project data between media applications. A method includes (a) operating a first project adapter module to convert a first media project generated by a first media application from a first project format into a generalized project format, thereby generating a generalized project; (b) operating a synchronization service to manage a set of contextual rules; (c) operating a second project adapter module to convert, with reference to the set of contextual rules, the generalized project into a second project format used by a second media application, thereby generating a second media project; and (d) viewing the second media project using the second media application. A system, apparatus, and computer program product for performing this method and similar methods are also described.

16 Claims, 8 Drawing Sheets

CENTRALIZED UNIVERSAL MEDIA OBJECT MANAGEMENT

CROSS-REFERENCE TO RELATED APPLICATIONS

This application claims priority under 35 U.S.C. § 119(e) to U.S. Provisional Patent Application Ser. No. 63/195,815, titled "CENTRALIZED UNIVERSAL MEDIA OBJECT MANAGEMENT," filed Jun. 2, 2021, the entire contents of which is incorporated herein by reference for all purposes.

BACKGROUND

Media (e.g., video, audio, etc.) editing and processing applications may access and manipulate media stored in a range of storage locations. Each of these applications maintains its own view of a project and applies its own unique logic to how video is edited and manipulated. Sharing project data between applications is generally performed client-side, by exporting and importing interchange/exchange formats such as Advanced Authoring Format (AAF), Edit Decision List (EDL) format, and/or other interchange/exchange formats. As an example, a user may export the contents of an Adobe Premiere Pro project as an AAF file and send that file to another user. The recipient may import that file into another application, such as DaVinci Resolve. Each client application implements its own interpretation of how to convert the imported file into its own native format.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to media object management for media editing and processing applications.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures.

DETAILED DESCRIPTION

When exporting and importing files, interoperability between applications is limited because one application may not recognize project items (e.g., sub-clips, markers, sequences, etc.) used by another application. Therefore, projects often cannot be exchanged back-and-forth between different applications without losing project items in one or both directions. Because each client provides its own interpretation/implementation of how to export and/or import interchange files, workflows can be inefficient and may require substantial human intervention during the export and/or import process.

One or more embodiments include a media object management platform, with associated contextual rules, that allows for centralized management of media objects and projects associated with those objects. Contextual rules may be tailored not only to each editorial tool, but also to the specific workflow team(s) collaborating using the platform. Unlike client-side document exchange workflows (e.g., exporting and importing AAF files), techniques described herein are well-suited to a distributed environment. In addition, techniques described herein may allow for a centralized view from a non-editorial application, such as a web-based media asset management tool. One or more embodiments facilitate continuous synchronization between editorial tools. Centralized media object management may include contextual logic that can be tailored depending, for example, on workflow demands for how media objects are presented to different tools.

In an embodiment, a media management system (e.g., EditShare FLOW and/or another media management system) includes a central repository for metadata associated with media production. The system may store data about media that has been discovered from a range of different storage mediums, which may be parsed/scanned to obtain technical information about the media (e.g., codec, video, audio track layout, etc.) and embedded metadata (e.g., Material eXchange Format (MXF) data and/or other embedded metadata).

A media management system may be configured to create a unique hash for media that allows a file to be tracked if it is relocated. The system may be configured to track embedded external identifiers (e.g., Avid MobIDs and/or other identifiers). The system may be configured to link one or more sidecar files to the media (e.g., via a matching partial file name and/or one or more other linking rules) to incorporate additional metadata (e.g., subtitles, etc.) and/or other kinds of information from other upstream systems. A "sidecar" file, which may also be referred to as a "buddy" file or "connected" file, is associated with a source file and stores metadata and/or other kinds of data not supported by the source file's original format.

In an embodiment, the system is configured to read and write project data from a range of different media production tools (e.g., Avid Project and Bin files, Adobe Premiere Pro Project files, DaVinci Resolve project databases, etc.) and/or application programming interfaces (APIs) for online editing tools (e.g., Blackbird.video). Alternatively or additionally, the system may support a range of other project data for other types of applications. For example, the system may support project data for audio tools (e.g., Avid Pro Tools, Apple Logic, etc.).

One or more embodiments include a set of microservices that implement rules for accessing project files and for coordinating the synchronization of data according to configurable contextual rules. For example, contextual rules may specify different ways of handling media objects (e.g., using high-resolution originals, lower-resolution proxies, and/or rendered files) depending on the intended use. Based on contextual rules, the system may be configured to generate multiple projects for the same tool, in order to support different use cases (e.g., color grading versus editing in DaVinci Resolve). As described in further detail herein, contextual rules may be default rules, user-specified/configured, and/or learned by the system via machine learning.

System Architecture

Figure 1:
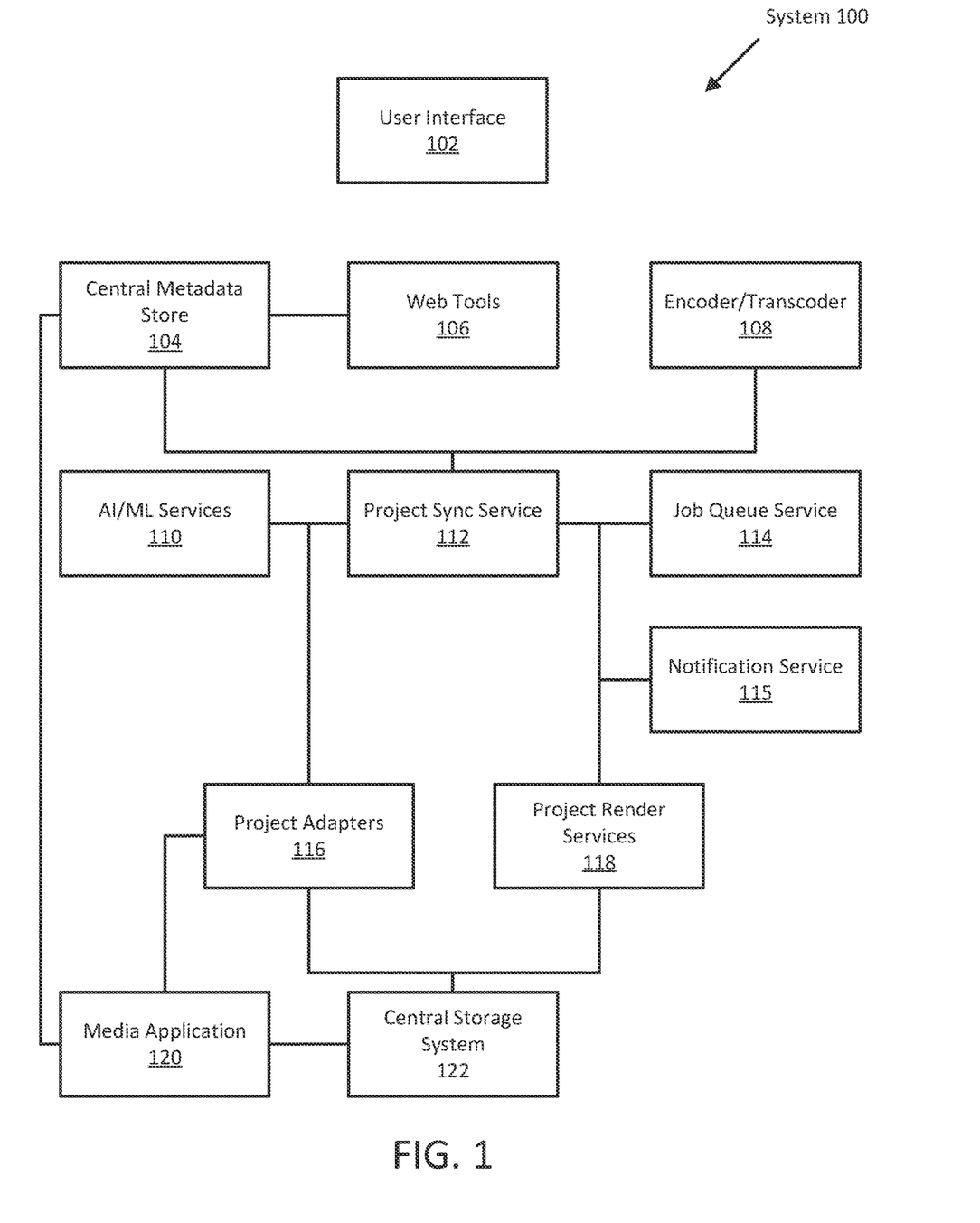
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In general, in an embodiment, the system 100 includes hardware and/or software configured to perform operations described herein for centralized media object management. For illustrative purposes, some examples described herein relate to video editing. These examples may be extended to other kinds of media objects and/or combinations thereof.

In an embodiment, project adapters 116 include microservices configured to parse a given project from a specific tool into a normalized media object representation. Alternatively or additionally, one or more project adapters 116 may be configured to take a defined set of normalized media objects and update an existing project file with changes supplied from other services. For example, project adapters 116 may include one or more adapters for Avid Media Composer, Adobe Premiere Pro projects, DaVinci Resolve projects, Blackbird.video projects, Frame.io projects, and/or one or more other stand-alone and/or web-based applications. One or more project adapters 116 may include rules to normalize data into a normalized media object format. For example, a project adapter 116 may be configured to map different representations of markers and colors to fit a normalized representation. An example of a normalized media object data model is described below.

A project adapter 116 may be configured to run fully or partially as a plugin/add-on to a media application 120. Running a project adapter 116 as a plugin/add-on may allow the project adapter 116 to access real-time information directly from users. Project adapters 116 may be configured to blend file parsing, application plugin, and/or other API access, to allow the project adapter 116 to take into account when projects are in use by end users or for offline processing. Alternatively or additionally, a project adapter 116 may include file locking and/or project backup functions as appropriate for the project format. For example, a project adapter 116 may be configured to create an Avid Bin "lck" file and create backups in an "attic" directory. In an embodiment, this approach allows a project adapter 116 to emulate standard application behavior, so as to work alongside users accessing projects within the associated application(s).

The system 100 may include one or more project render services 118. A project render service 118 may be configured to render a project using the appropriate rendering technology (for example, using Adobe Media Encoder or running DaVinci Resolve in a headless mode). The system 100 may be configured to attach the output of a project render service 118 to a normalized media object for viewing in one or more other tools (which may include one or more online tools). Attaching the output of a project render service 118 to a normalized media object may facilitate certain workflows that use rendered media. For example, workflow may include providing a rendered video for preview within color grading or special effects tools, or providing a rough cut to send to the sound and music department for conforms/assembly. Alternatively or additionally, a project render service 118 may be instructed to render with additional data either embedded into the media or burnt in. For example, a project render service 118 may render video with burnt in timecodes, overlay watermarks, etc.

If a project render service 118 is not available for a specific project format, a project adapter 116 may be configured to extract a format that can be rendered in a different tool than the original project. The resulting rendering may not be a fully accurate rendering of the final project, but may provide an appropriate approximation of the project for viewing in other tools. One or more project render services 118 may be used in parallel or chained for throughput.

To coordinate various services, the system 100 may include one or more project synchronization (or "sync") services 112. A project sync service 112 may be configured to provide contextual rules to manage normalized media objects. A project sync service 112 may be configured to interact with a central metadata store 104, to ensure that project data can be matched against scanned media and other data not stored in project files. Alternatively or additionally, a project sync service 112 may be configured to interact with one or more artificial intelligence (AI) and/or machine learning (ML) services 110, to generate additional metadata such as object detection, face recognition, speech to text, etc.

A project sync service 112 may be configured to create placeholder data and store the placeholder data in the central metadata store 104, for example in situations where data is not complete or no match can be found. For example, placeholder data may allow a complete set of clips, subclips, and sequences to be ingested into the central metadata store 104 even if the media is not yet known to the system. Placeholder data may allow for normalized media object data to be sent to other services, even if full knowledge of the media is not fully discovered by the central metadata store 104. When the central metadata store 104 receives new scanned metadata about the files, the central metadata store 104 may be configured to match the newly received metadata to the placeholders. Matching the metadata to the placeholders may use, for example, a combination of embedded identifiers (e.g., MobID), file hashes, naming conventions, and/or another rule or combination thereof.

A project sync service 112 may be configured to store tracking information to identify information such as the origin of the data, the first time that data was found, when it was last modified, etc. Alternatively or additionally, a project sync service 112 may be configured to select a particular source to be the "primary" for one or more normalized media objects and apply appropriate rules to all secondary sources. For example, a project sync service 112 may make the primary read/write by applications and all secondary sources read-only. Alternatively or additionally, a project sync service 112 may allow all sources to be primary and implement appropriate conflict resolution logic should two sources provide simultaneous updates.

In an embodiment, to help facilitate compatibility of media across editing tools, a project sync service 112 may be configured to interact with one or more encoders/transcoders 108. The encoder(s)/transcoder(s) 108 may be configured to convert between formats that are optimal for the various client applications and their position within an end-to-end workflow. A project sync service 112 may be configured to select an appropriate encoder/transcoder 108 for the input and output destinations. An encoder/transcoder 108 may include, for example, one or more of MainConcept, AWS Elemental, Adobe Media Encoder, DaVinci Resolve, Encoding.com and/or another kind of encoder and/or transcoder or combination thereof.

A project sync service 112 may be configured to interact with a job queue service 114, to allow prioritized execution of transcoding and/or project adapter tasks. For example, a change to a normalized media object that spans multiple projects may be prioritized to execute against current active projects before updating any older projects. Alternatively or additionally, the job queue service 114 may be configured to prioritize execution of one or more particular project adapters 116 over others. For example, the job queue service 114 may be configured to prioritize keeping an Avid Project up to date, over a DaVinci Resolve project.

A project sync service 112 may be configured to interact with a notification service 115. The notification service 115 may be part of a job queue service 114 or may be a separate component. The notification service 115 is configured to provide notifications to one or more services and/or applications in the system 100, to inform them of data changes. For example, notifications may trigger applications to refresh their views of a project, or to execute additional contextual rules and/or workflows.

Contextual rules for a project sync service 112 may include one or more of: embedded default rules; user-configured workflows; and/or computed rules. For example, the system 100 may be configured to generate computed rules using previous project data as training data for a machine learning service 110, to identify patterns within one or more end users' and/or organizations' workflow(s).

Using a combination of coordinating services as described herein, the system 100 may be configured to implement new workflows. For illustrative purposes, the following is one example of a workflow, according to one or more embodiments:

The system 100 ingests media into a central storage system 122, scans the media, and generates initial normalized media object data.

A project sync service 112 applies contextual rules to organize the media into virtual bins within the central metadata store 104, according to technical data supplied (e.g., camera information, timecodes, etc.) and additional metadata extracted using tools such as speech to text, object recognition, and/or information from AI/ML services 110.

Assistant editors use web tools 106 to assemble a set of shot lists, which are sequences of clips and/or sub-clips that may be used by the editorial team as a starting point or for directors to preview daily shoot output.

When the shot list is approved (or at any time as called for by the workflow), a project sync service 112 triggers the generation of project files in different formats. An Avid Bin is created, with all media "Avid Media Access (AMA) linked" (imported into the bin not in native Avid formats, and dependent on an appropriate AMA plugin). An Adobe Premiere Pro project is created with the source media and proxies linked to allow for native proxy toggling.

The project sync service 112 coordinates the creation of MXF files for the media in the bins that are within the initial shot list. As these complete, the project sync service 112 can instruct a project adapter 116 for Avid to update the clips from AMA linked media to managed media. The project sync service 112 may select appropriate storage locations for the media type(s) and project destination. For example, the project sync service 112 may place a copy of all material required for color grading into a high throughput store, while keeping the originals in a lower throughput store.

As the system 100 ingests additional material, it synchronizes that material out to project files, to allow editors rapid access to new material.

As the edit progresses, a DaVinci Resolve project can be updated with a high-resolution render of sequences created in both Avid Media Composer and Adobe Premiere Pro, with timeline markers shared from those created in Avid Media Composer, Adobe Premiere Pro, and other online tools such as EditShare's AirFLOW.

Users of the DaVinci Resolve project may add markers within the timeline, to indicate issues found within the video. Using a particular color or using other conventions (e.g., a naming convention) adding the markers can trigger the project sync service 112 to automatically synchronize the markers back to other projects, within the original project bins and/or in a newly created "feedback" bin.

When a project is complete, it may be marked as "archived." Project files may be set to a read-only or locked state. Media used across the different project files may be sent to archive storage locations. The specific storage locations may depend on rules based on their usage. For example, video used only to render visual effects projects may be sent to a deep archive (e.g., tape), while the resultant rendered video used in other projects may be kept in an offline disk-based archive.

If a project is restored from an archive, the project sync service 112 may prioritize particular media depending on the restoration project type. For example, if the project will be restored for use in Avid Media Composer, then MXF files only may be restored.

If project files are restored from an archive where the application for those project files is no longer available, the project sync service 112 may apply logic to recreate the project for a different application, with rules configured to appropriately map the original project information to the new application.

In an embodiment, one or more components of the system 100 are implemented on one or more digital devices. The term "digital device" generally refers to any hardware device that includes one or more processors. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

One or more components of the system 100 may include, respectively, one or more user interfaces 102. A user interface 102 refers to hardware and/or software configured to facilitate communications between a user and a component of the system 100. A user interface 102 renders user interface elements and receives input via user interface elements. A user interface 102 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms. Different components of a user interface 102 may be specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 102 may be specified in one or more other languages, such as Java, Python, Perl, C, C++, and/or any other language or combination thereof.

Example Normalized Media Object Data Model

In an embodiment, a normalized media object data model includes standardized structures for a wide range of project elements. Based on the model, normalized media objects may include relevant project data (e.g., clip data, sub clips, markers, sequences, etc.) that can be shared between tools. Normalized media objects may omit some or all data from within a tool-specific project file that is proprietary to that tool and/or not useful for collaboration between tools. Project adapters 116 may be configured to normalize to the normalized format to the extent possible, for increased interoperability. In addition, the normalized media object data model may support extended fields that can be provided by a source project adapter 116, even if they are not used by other adapters.

Figure 2:
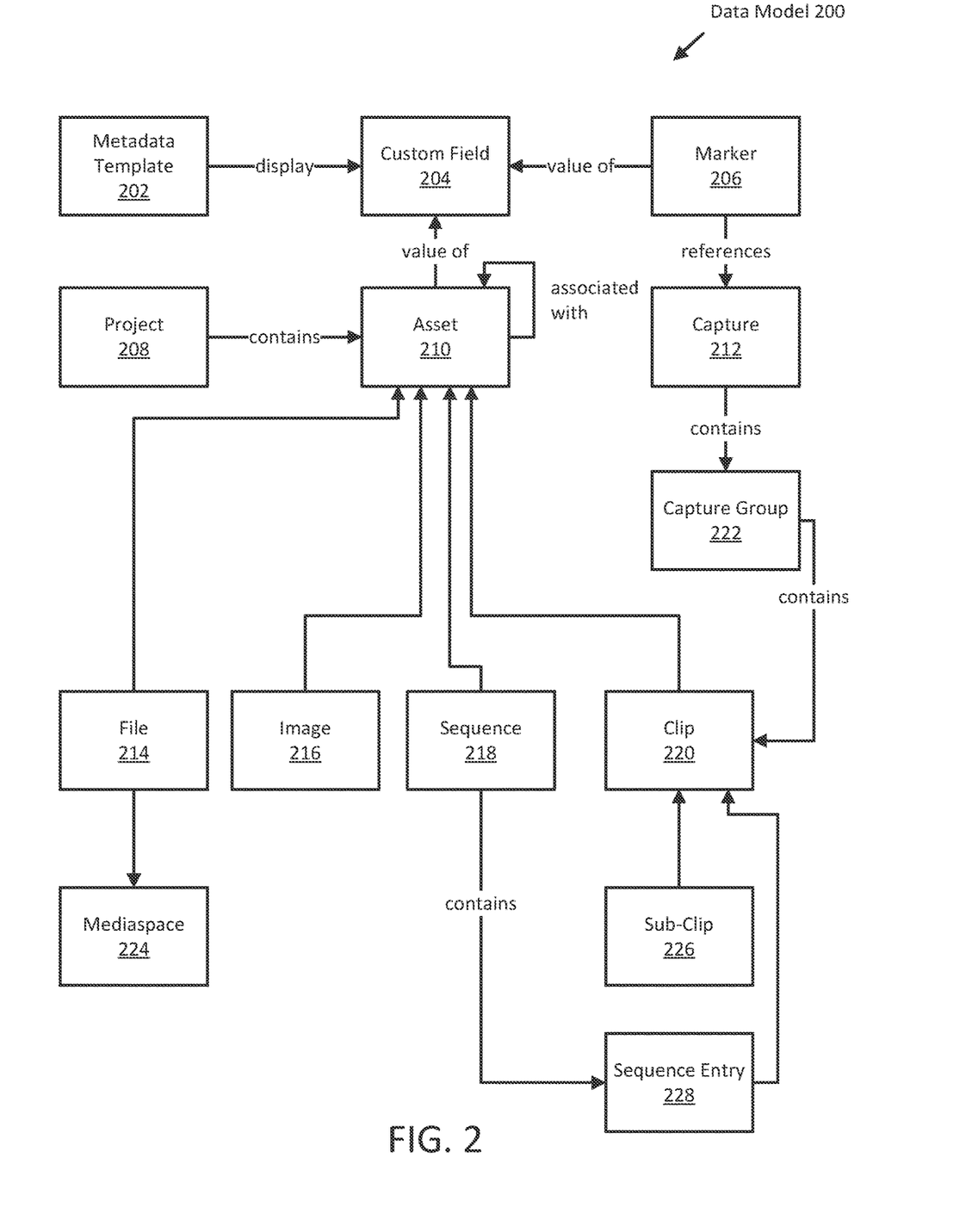
FIG. 2 is a block diagram of an example of a normalized media object data model according to an embodiment.

FIG. 2 is a block diagram of an example of a normalized media object data model 200 according to an embodiment. Components and/or operations of this data model 200 should be understood as examples that may not be applicable to one or more embodiments. Accordingly, components and/or operations described below should not be construed as limiting the scope of one or more embodiments.

In an embodiment, components of the example data model 200 illustrated in FIG. 2 are stored as fields in a database. The system may be configured to export the fields to an intermediate format (e.g., JavaScript Object Notation (JSON), extensible markup language (XML), or another format) before generating tool-specific project files.

In this example, the core object is an asset 210. An asset 210 can represent many things, including but not limited to a raw file 214, an image 216 (e.g., a photo or other kind of image), a clip 220 (video and/or audio), and/or a sequence 218 (a series of clips). An asset 210 may have a core set of fields, but can also have one or more custom fields 204 storing metadata to extend the core data for a wide range of use cases. Custom fields 204 may be grouped into one or more metadata templates 202 that can be used for display purpose and/or other grouping needs. A metadata template 202 may be useful, for example, when different metadata is relevant for a particular use case or particular client application.

One or more assets 210 may be collected into one or more projects 208. A project 208 may bring together required clips, sequences, and/or other assets 210 for a particular piece of work.

A sequence 218 is a type of asset 210 that represents an ordered set of clips 220. Sequence entries 228 may be assigned to particular tracks (e.g., Video1, Video2, Audio1, etc.) and may include offsets from the start of the sequence 218. When a sequence 218 is rendered/conformed by a non-linear editor (NLE), the resultant file 214 may become an asset 210 that is associated with the sequence 218. The file 214 may then be used as a substitute for the sequence 218, for example if an application is unable to accurately render the individual elements of the sequence 218.

To handle the ingest of synchronized video from multiple sources (e.g., multiple cameras of a live ingest or multiple files of a recorded scene), the data model 200 may support the concept of a capture 212. A capture 212 may include multiple capture/chunk groups 222 that represent the various video feeds. A capture group 222 may include multiple chunks of videos that are available as clips 220. Responsive to a single file being ingested, the system may be configured to create a capture 212 and capture group 222 automatically. Responsive to multiple streams or files being ingested, the system may be configured to allocate a capture 212 ahead of time and align the multiple streams or files under that capture 212. Alternatively or additionally, capture information may be determined from project information (for example, if multiple clips are combined into a multi-camera clip).

In the example data model 200 of FIG. 2, markers 206 represent timeline data. A marker 206 may represent a single point in time or a time range. A marker 206 is associated with a capture 212 or with a sequence 218, making it possible to create markers 206 that span multiple time-aligned clips 220. Like assets 210, markers 206 may include custom fields 204.

Artificial Intelligence and Machine Learning

In embodiment, a machine learning engine (sometimes referred to as "artificial intelligence") trains a machine learning model to perform one or more operations. For example, as described herein, machine learning may be used to generate metadata from media objects, such as object detection, face recognition, speech to text, etc. Alternatively or additionally, as described herein, machine learning may be used to generate contextual rules based on patterns in user behavior. For example, machine learning may be used to generate contextual rules relating to media object organization, workflow optimization (for example, learning which project files are relevant in particular phases of production), extracting action sequences from user interaction with a project file and replicating this behavior when writing back to the project, and/or other kinds of automated behaviors based on user behavior patterns detected using machine learning.

Training a machine learning model uses training data to generate a function that, given one or more inputs to the machine learning model, computes a corresponding output. The output may correspond to a prediction based on prior machine learning. In an embodiment, the output includes a label, classification, and/or categorization assigned to the provided input(s). The machine learning model corresponds to a learned model for performing the desired operation(s) (e.g., labeling, classifying, and/or categorizing inputs). A system may use multiple machine learning engines and/or multiple machine learning models for different purposes.

In an embodiment, the machine learning engine may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. For example, training data may be labeled with the locations of objects and/or faces, text renditions of speech, a desired contextual rule output given a known set of input data, etc. In semi-supervised learning, some inputs are associated with supervisory signals and other inputs are not associated with supervisory signals. In unsupervised learning, the training data does not include supervisory signals. Reinforcement learning uses a feedback system in which the machine learning engine receives positive and/or negative reinforcement in the process of attempting to solve a particular problem (e.g., to optimize performance in a particular scenario, according to one or more predefined performance criteria). In an embodiment, the machine learning engine initially uses supervised learning to train the machine learning model and then uses unsupervised learning to update the machine learning model on an ongoing basis.

In an embodiment, a machine learning engine may use many different techniques to label, classify, and/or categorize inputs. A machine learning engine may transform inputs into feature vectors that describe one or more properties ("features") of the inputs. The machine learning engine may label, classify, and/or categorize the inputs based on the feature vectors. Alternatively or additionally, a machine learning engine may use clustering (also referred to as cluster analysis) to identify commonalities in the inputs. The machine learning engine may group (i.e., cluster) the inputs based on those commonalities. The machine learning engine may use hierarchical clustering, k-means clustering, and/or another clustering method or combination thereof. In an embodiment, a machine learning engine includes an artificial neural network. An artificial neural network includes multiple nodes (also referred to as artificial neurons) and edges between nodes. Edges may be associated with corresponding weights that represent the strengths of connections between nodes, which the machine learning engine adjusts as machine learning proceeds. Alternatively or additionally, a machine learning engine may include a support vector machine. A support vector machine represents inputs as vectors. The machine learning engine may label, classify, and/or categorizes inputs based on the vectors. Alternatively or additionally, the machine learning engine may use a naïve Bayes classifier to label, classify, and/or categorize inputs. Alternatively or additionally, given a particular input, a machine learning model may apply a decision tree to predict an output for the given input. Alternatively or additionally, a machine learning engine may apply fuzzy logic in situations where labeling, classifying, and/or categorizing an input among a fixed set of mutually exclusive options is impossible or impractical. The aforementioned machine learning model and techniques are discussed for exemplary purposes only and should not be construed as limiting one or more embodiments.

Operation

Figure 3:
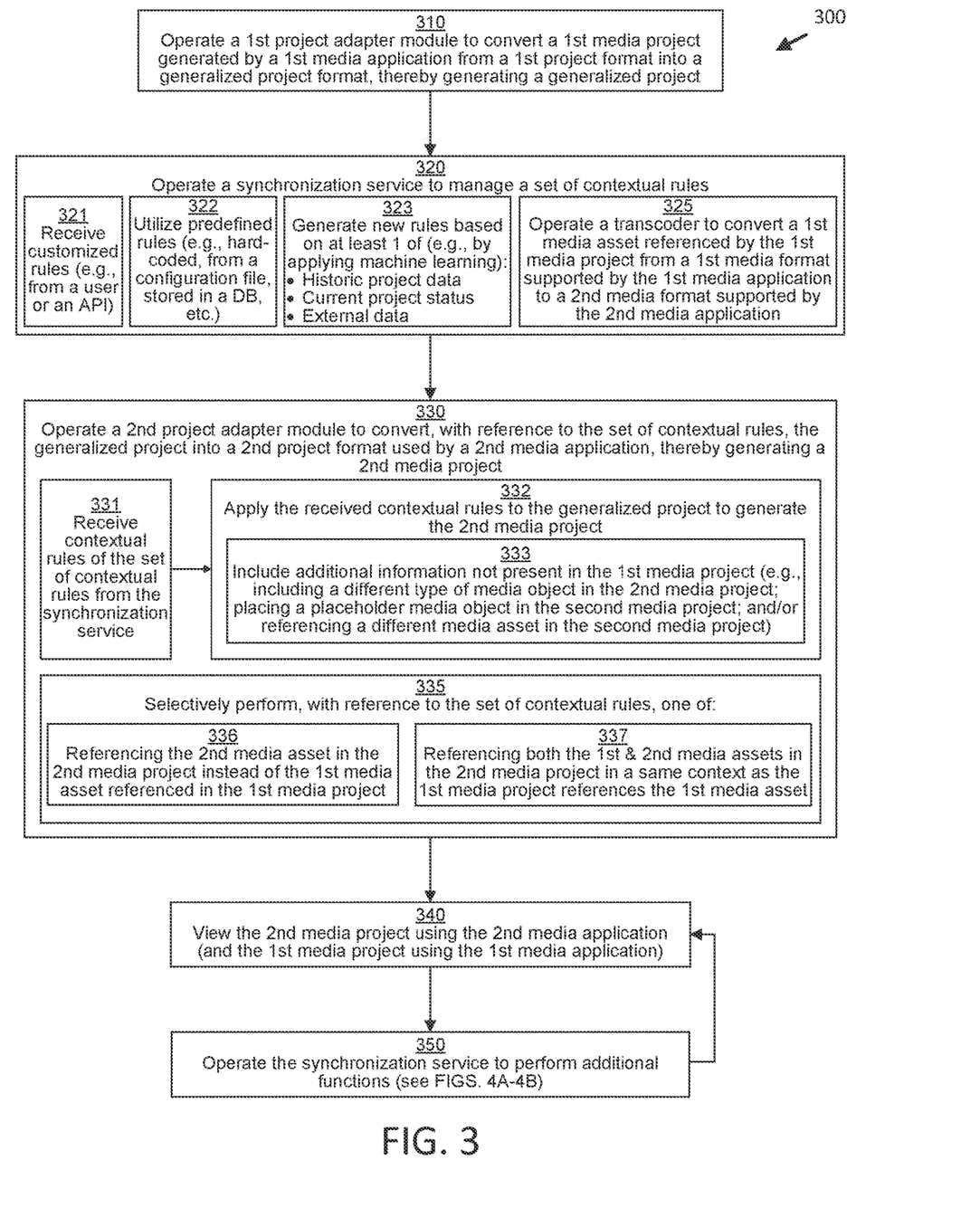
FIG. 3 is a flowchart depicting an example method according to an embodiment.

FIG. 3 illustrates an example method 300 performed by a system 100 for synchronizing project data between media applications. It should be understood that any time a piece of software is described as performing a method, process, step, or function, what is meant is that a computing device on which that piece of software is running performs the method, process, step, or function when executing that piece of software on its processing circuitry. It should be understood that one or more of the steps or sub-steps of method 300 may be omitted in some embodiments. Similarly, in some embodiments, one or more steps or sub-steps may be combined together or performed in a different order.

In step 310, a first project adapter module 116 operates to convert a first media project generated by a first media application 120 from a first project format into a generalized project format, thereby generating a generalized project.

In step 320, a synchronization service (e.g., project sync service 112) is operated to manage a set of contextual rules. In some embodiments, synchronization service 112 performs this management by performing one or more of sub-steps 321, 322, 323. In sub-step 321, synchronization service 112 receives one or more customized rules (e.g., from a user via user interface 102, via an API, etc.). In sub-step 322, synchronization service 112 utilizes one or more predefined rules (e.g., rules that are hard-coded in the synchronization service 112, from a configuration file, stored in a database, etc.). In sub-step 323, synchronization service 112 generates new rules based on at least one of historical project data, current project status, and external data. Sub-step 323 may include applying machine learning, e.g., using AI/ML services 110 (see above), to generate some of the new rules of the set of contextual rules.

In sub-step 325, synchronization service 112 operates a transcoder 108 to convert a first media asset 210 referenced by the first media project from a first media format supported by the first media application 120 to a second media format supported by the second media application 120. In some embodiments, the first media format is not supported by the second media application. In some embodiments, the first media format is supported by the second media application, but the second media format is preferred to the first media format by the second media application. See below in connection with FIG. 5.

Figure 5:
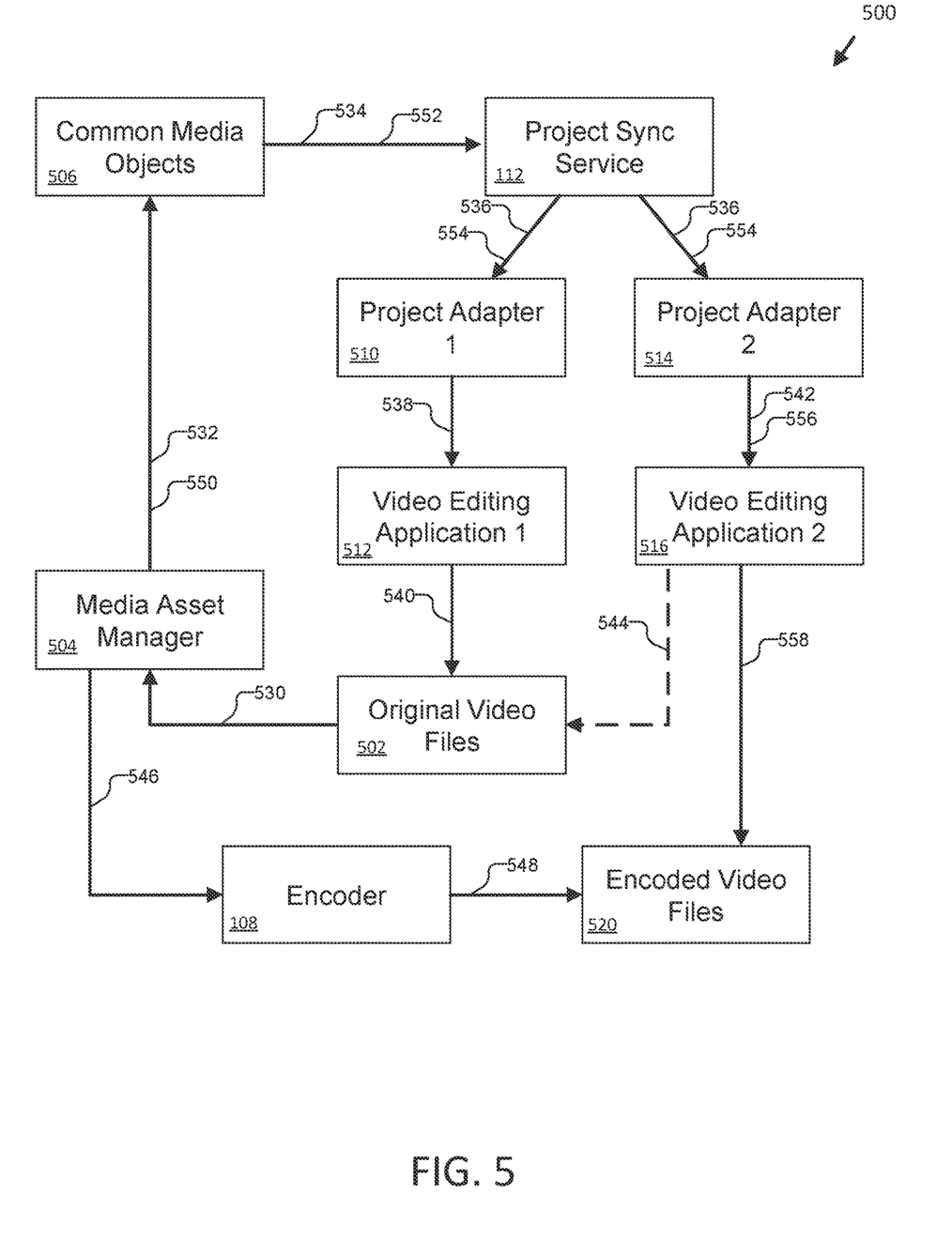
FIG. 5 is a block diagram system and method according to an embodiment.

In FIG. 5, a system 500 is depicted for ingesting new media (e.g., original video files 502) into a project 208. In step 530, media asset manager (MAM) 504 scans the original video file 502 to identify the location and technical attributes of the media. Then, in step 532, MAM ingests media objects into a common media objects model 506. Then, in step 534, the new media 502 is added to a project 208 and the project synchronization service 112 is notified. Then, in step 536, project synchronization service 112 requests updates from project adapter 1 510 (associated with video editing application 1 512, with project adapter 1 510 serving as the project adapter 116 and video editing application 1 512 serving as its associated media application 120) and project adapter 2 514 (associated with video editing application 2 516, with project adapter 2 514 serving as the project adapter 116 and video editing application 2 516 serving as its associated media application 120).

In step 538, in response to step 536, Project Adapter 1 510 is aware that the original video file 502 can be directly imported into video editing application 1 512 and adds it to the media project compatible with video editing application 1 512, and, in step 540, video editing application 1 512 references the original video file 502 in its version of the media project.

In step 542, in response to step 536, Project Adapter 2 514 is aware that the original video file 502 cannot be directly imported into video editing application 2 516 (or, in some embodiments, it can be, but only sub-optimally) and therefore only indirectly links the original video file 502 to the media project compatible with video editing application 2 516. In some embodiments, in step 544, video editing application 2 516 initially references the original video file 502 in its version of the media project, but it should be understood that not all features are available while editing the referenced original video file 502 using this type of reference.

In step 546, MAM 504 directs encoder 108 to encode the original video file 502 into a different format, such as one that is preferred by video editing application 2 516. In response, in step 548, encoder 108 transcodes the original video file 502 into an encoded video file 520 in the preferred format of video editing application 2 516. Then, in step 550, MAM 504 adds the availability of the encoded video file 520 into the common media objects model 506. Then, in step 552, the project synchronization service 112 is notified of the update. Then, in step 554, project synchronization service 112 requests further updates from project adapter 1 510 and project adapter 2 514.

Only project adapter 2 514 responds to the request 554, and, in step 556, replaces the original video file 502 that was linked in step 544 with a link to the encoded video file 520. In step 558, video editing application 2 516 references the encoded video file 520 in its version of the media project. In some embodiments, the reference to the encoded video file 520 entirely replaces the old reference to the original video file 502 (from step 544), while in other embodiments, both references may coexist in the media project of video editing application 2 516.

Returning to FIG. 3, in step 330, second project adapter module 514 operates to convert, with reference to the set of contextual rules, the generalized project into a second project format used by the second media application 516, thereby generating a second media project. In some embodiments, step 330 includes sub-steps 331-332. In sub-step 331, the second project adapter 514 receives contextual rules of the set of contextual rules from the synchronization service 112. It should be understood that either all or only some of the contextual rules of the set of contextual rules may be sent from the synchronization service 112 to the second project adapter. For example, in some embodiments, only contextual rules that are relevant are sent. Then, in sub-step 332, second project adapter 514 applies the received contextual rules (as well as external information) to the generalized project to generate the second media project used by the second media application 516. Sub-step 332 may further include sub-step 333, in which second project adapter 514 includes additional information not present in the first media project used by the first media application 512. For example, the second media project may include a different type of media object than was included in the first media project (e.g., a replacement wipe may replace an original wipe between two scenes); the second media project may include a placeholder media object in place of an original media object that was included in the first media project (e.g., a description of an unsupported media object may be overlaid over the video, while the original media object is still referenced); and/or referencing a different media asset in the second media project (e.g., encoded video file 520 may replace original video file 502 as in FIG. 5).

In some embodiments, step 330 includes sub-step 335. In sub-step 335, which may be performed in embodiments in which sub-step 325 was also performed, second project adapter 514 selectively performs either sub-step 336 or 337 with reference to the contextual rules. In sub-step 336, second project adapter 514 references the second media asset (e.g., encoded video file 520 from the example of FIG. 5) instead of referencing the first media asset (e.g., original video file 502 from the example of FIG. 5) that was referenced in the first media asset that was included in the first media project. In sub-step 337, second project adapter 514 references both the first media asset (e.g., original video file 502 from the example of FIG. 5) and the second media asset (e.g., encoded video file 520 from the example of FIG. 5) in the same context in which the first media project referenced only the first media asset.

In step 340, a user is able to view (and, in some embodiments, also edit) the second media project using the second media application 516. At the same time, a user is able to view (and, in some embodiments, also edit) the first media project using the first media application 512.

Figure 4A:
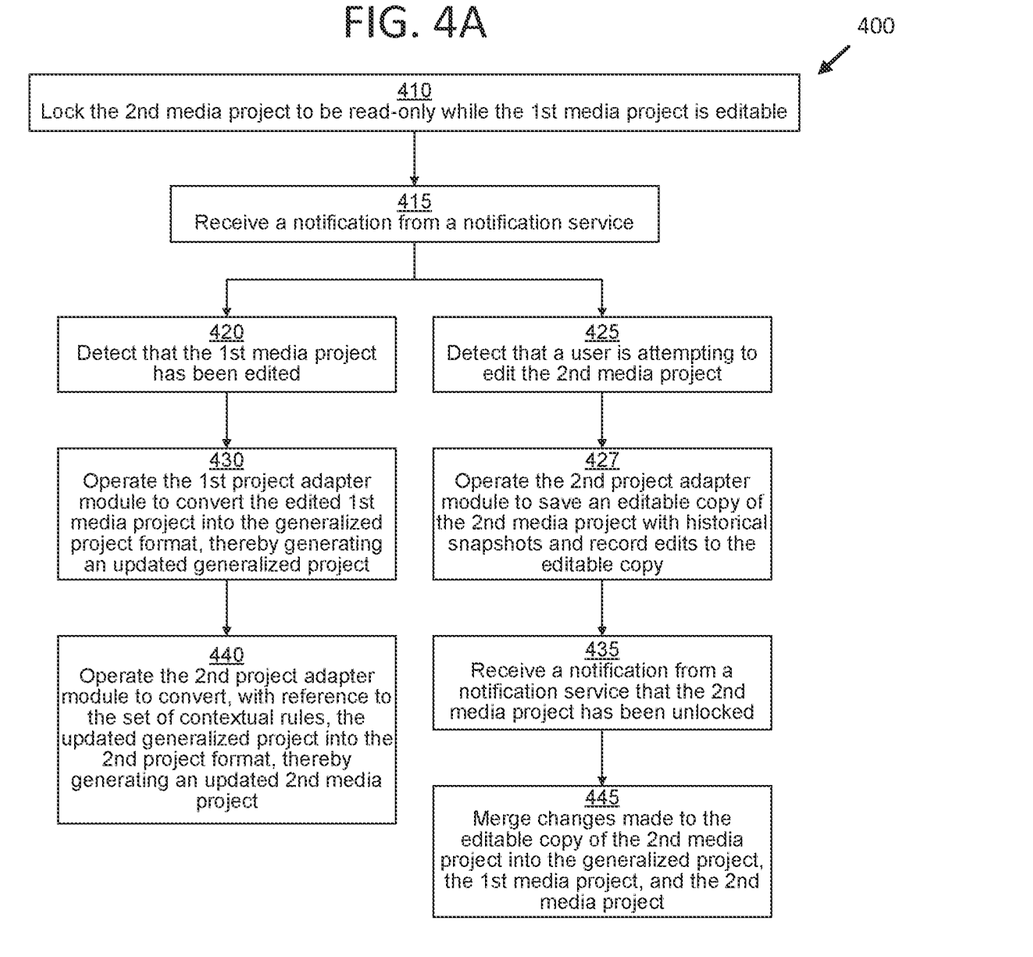
FIG. 4A is a flowchart depicting an example method according to an embodiment.
Figure 4B:
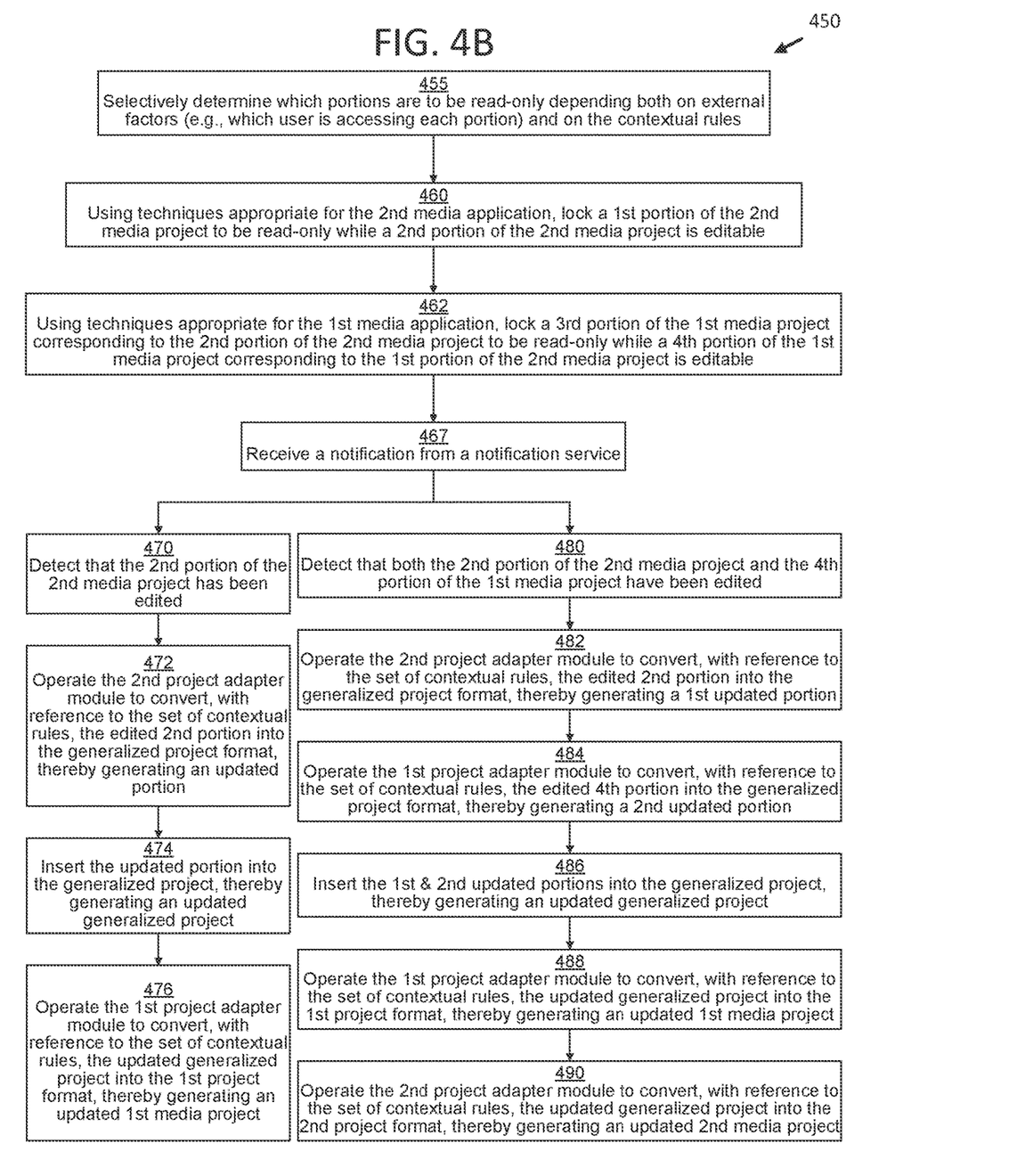
FIG. 4B is a flowchart depicting an example method according to an embodiment.

In step 350, the synchronization service 112 may further operate to perform additional synchronization functions, such as, for example, locking, as depicted in FIGS. 4A, 4B. Then operation may return back to step 340 for updated versions of the first and/or second projects to be displayed or edited.

FIG. 4A depicts an example method 400 that may implement step 350 of method 300 according to some embodiments. In step 410, synchronization service 112 locks the second media project to be read-only while the first media project is editable. In step 115, synchronization service 112 receives a notification from notification service 115.

In step 420, synchronization service 112 detects that the notification indicates that the first media project has been edited. Then, in step 430, first project adapter 510 operates to convert the edited version of the first media project into the generalized project format with reference to the set of contextual rules, thereby generating an updated generalized project. Then, in step 440, second project adapter 514 operates to convert the updated generalized project into the second project format with reference to the set of contextual rules, thereby generating an updated second media project.

In step 425, synchronization service 112 detects that the notification indicates that a user is attempting to edit the second media project, which has been locked. Then, in step 427, second project adapter 514 operates to save an editable copy of the second media project, the editable copy employing historical snapshots, allowing the user to make the desired edits to the editable copy. Then, in step 435, synchronization service 112 receives a notification from notification service 115 indicating that the second media project has been unlocked. Then, in step 445, second project adapter 514 operates to merge the changes that were made to the editable copy of the second media project into the generalized project and into the main second media project. First project adapter 510 also operates to merge those changes from the generalized project into the first media project.

FIG. 4B depicts an example method 450 that may implement step 350 of method 300 according to some embodiments. In step 455, synchronization service 112 selectively determines which portions (also referred to as "bins") of the first and second media projects are to be made read-only depending both on external factors (e.g., which user is accessing each portion) and on the contextual rules. In an example, a first portion of the second media project and a third portion of the first second media project may be determined to be read-only. Then, in step 460, synchronization service 112, using techniques appropriate for the second media application 516, locks a first portion of the second media project to be read-only while a second portion of the second media project is editable. In step 462, which may be performed in parallel with step 460, synchronization service 112, using techniques appropriate for the first media application 512, locks a third portion of the first media project corresponding to the editable second portion of the second media project to be read-only while a fourth portion of the first media project corresponding to the read-only first portion of the second media project is editable.

In step 467, synchronization service 112 receives a notification from notification service 115.

In step 470, synchronization service 112 detects that the notification indicates that the second portion (which is editable) of the second media project has been edited. Then, in step 472, second project adapter 514 operates to convert the edited second portion of the second media project into the generalized project format with reference to the set of contextual rules, thereby generating an updated portion. Then, in step 474, second project adapter 514 places the updated portion into the generalized project, thereby generating an updated generalized project. Then, in step 476 first project adapter 510 operates to convert the updated generalized project into the first format with reference to the set of contextual rules, thereby generating an updated first media project.

In step 480, synchronization service 112 detects that the notification indicates that both the second portion of the second media project and the fourth portion of the first media project (both of which are editable) have been edited. Then, in step 482, second project adapter 514 operates to convert the edited second portion of the second media project into the generalized project format with reference to the set of contextual rules, thereby generating a first updated portion. In step 484, which may occur in parallel with step 482, first project adapter 510 operates to convert the edited fourth portion of the first media project into the generalized project format with reference to the set of contextual rules, thereby generating a second updated portion. Then, in step 486, second project adapter 514 places the first updated portion into the generalized project, and first project adapter 510 places the second updated portion into the generalized project, thereby generating an updated generalized project. Then, in step 488 first project adapter 510 operates to convert the updated generalized project into the first format with reference to the set of contextual rules, thereby generating an updated first media project. In step 490, which may occur in parallel with step 488, second project adapter 514 operates to convert the updated generalized project into the second format with reference to the set of contextual rules, thereby generating an updated second media project.

Figure 6:
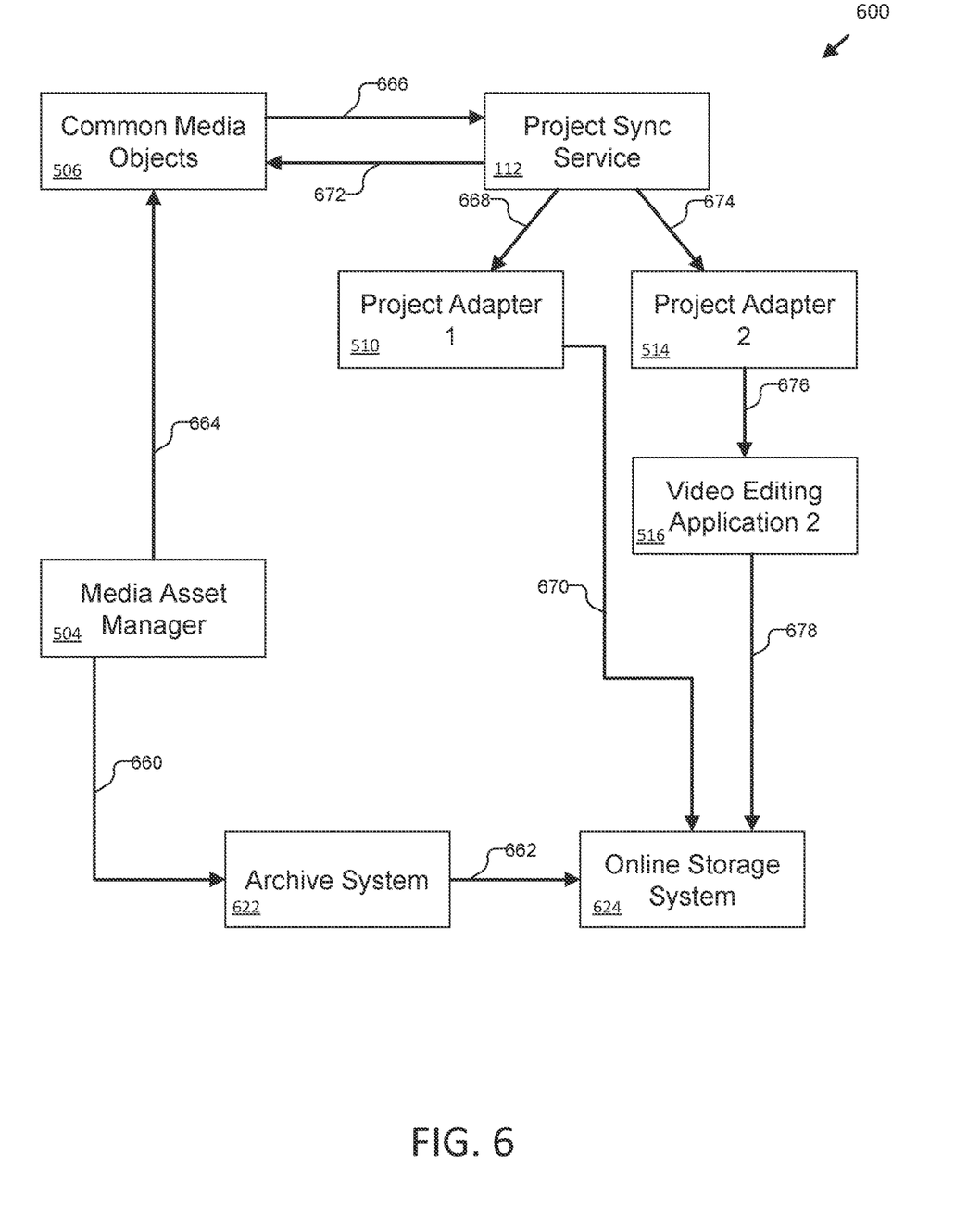
FIG. 6 is a block diagram system and method according to an embodiment.

In FIG. 6, a system 600 is depicted for restoring files from an archive system 622. In step 660, MAM 504 requests media and project files to be restored from the archive system 622. Then, in step 662, archive system 622 writes restored files to an online storage system 624. Then, in step 664, MAM ingests the restored files into the common media objects model 506 to show their online availability. Then, in step 666, the project synchronization service 112 is notified of the online availability of the restored files. Then, in step 668, project synchronization service 112 requests project data from Project Adapter 1 510 to read restored project files previously archived from Video Editing Application 1 512. Project adapter 1 510 responds, in step 670, by reading and parsing the restored project files from the online storage system 624. Then, in step 672, project synchronization service 112 updates the common media objects model 506 with project data that was obtained by Project adapter 1 510 during step 670. Then, in step 674, project synchronization service 112 requests from project adapter 2 514, update of project files, and, in response, in step 676, project adapter 2 514 video editing application 2 516 reads the created project data, and in step 678, video editing application 2 516 references restored media from online storage system 624.

Miscellaneous; Computer Systems; Networks

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 7:
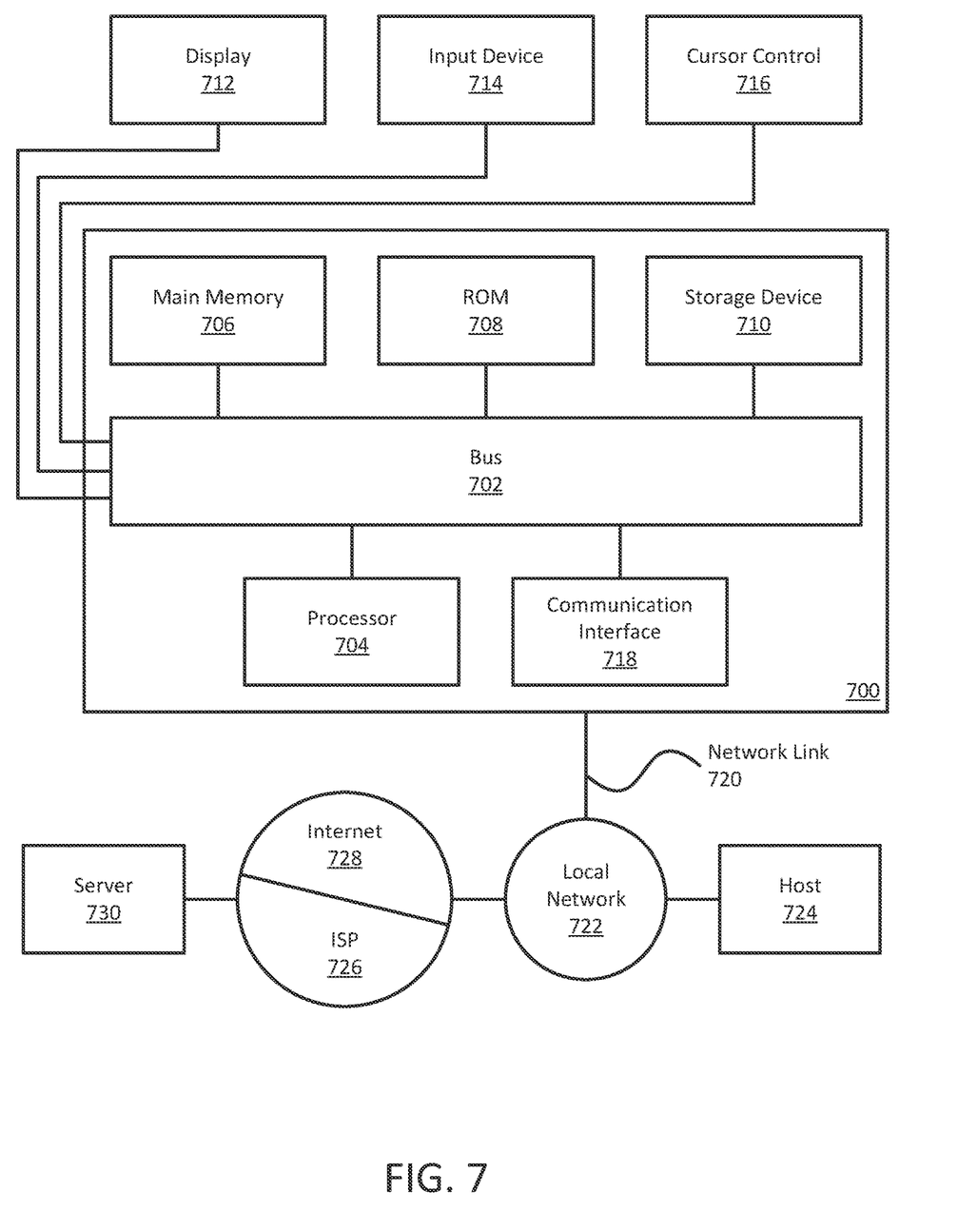
FIG. 7 is a block diagram of an example of a computer system according to an embodiment.

For example, FIG. 7 is a block diagram of an example of a computer system 70700 according to an embodiment. Computer system 700 includes a bus 702 or other communication mechanism for communicating information, and one or more hardware processors 704 coupled with the bus 702 for processing information. Hardware processor(s) 704 may include one or more general-purpose microprocessors.

Computer system 700 also includes a main memory 706, such as a random access memory (RAM) or other dynamic storage device, coupled to bus 702 for storing information and instructions to be executed by processor(s) 704. Main memory 706 also may be used for storing temporary variables or other intermediate information during execution of instructions to be executed by processor(s) 704. Such instructions, when stored in one or more non-transitory storage media accessible to processor(s) 704, render computer system 700 into a special-purpose machine that is customized to perform the operations specified in the instructions.

Computer system 700 further includes a read only memory (ROM) 708 or other static storage device coupled to bus 702 for storing static information and instructions for processor(s) 704. A storage device 710, such as a magnetic disk or optical disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor(s) 704. Alternatively or additionally, computer system 700 may receive user input via a cursor control 716, such as a mouse, a trackball, a trackpad, or cursor direction keys for communicating direction information and command selections to processor(s) 704 and for controlling cursor movement on display 712. This input device typically has two degrees of freedom in two axes, a first axis (e.g., x) and a second axis (e.g., y), that allows the device to specify positions in a plane. Alternatively or additionally, computer system 3 may include a touchscreen. Display 712 may be configured to receive user input via one or more pressure-sensitive sensors, multi-touch sensors, and/or gesture sensors. Alternatively or additionally, computer system 700 may receive user input via a microphone, video camera, and/or some other kind of user input device (not shown).

Computer system 700 may implement the techniques described herein using customized hard-wired logic, one or more ASICs or FPGAs, firmware, and/or program logic which in combination with other components of computer system 700 causes or programs computer system 700 to be a special-purpose machine. According to one embodiment, the techniques herein are performed by computer system 700 in response to processor(s) 704 executing one or more sequences of one or more instructions contained in main memory 706. Such instructions may be read into main memory 706 from another storage medium, such as storage device 710. Execution of the sequences of instructions contained in main memory 706 causes processor(s) 704 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 702. Transmission media may also take the form of acoustic or light waves, such as those generated during radio-wave and infra-red data communications.

Various forms of media may be involved in carrying one or more sequences of one or more instructions to processor(s) 704 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 70700 may receive the data from the network and place the data on bus 702. Bus 702 carries the data to main memory 706, from which processor(s) 704 retrieves and executes the instructions. The instructions received by main memory 706 may optionally be stored on storage device 710 either before or after execution by processor(s) 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722, and communication interface 718.

The received code may be executed by processor(s) 704 as it is received, and/or stored in storage device 710, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant IDs. Additionally or alternatively, data structures and/or datasets, stored by the computer network, are tagged with tenant IDs. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

It should be understood that all embodiments which have been described may be combined in all possible combinations with each other, except to the extent that such combinations have been explicitly excluded.

What is claimed is:

1. A method of synchronizing project data between media applications using a computing device, the method comprising:
   operating a first project adapter module to convert a first media project generated by a first media application from a first project format into a generalized project format, thereby generating a generalized project;
   operating a synchronization service to manage a set of contextual rules;
   operating a second project adapter module to convert, with reference to the set of contextual rules, the generalized project into a second project format used by a second media application, thereby generating a second media project;
   viewing the second media project using the second media application; and
   operating the synchronization service to:
      using techniques appropriate for the second media application, lock a first portion of the second media project to be read-only while a second portion of the second media project is editable; and
      using techniques appropriate for the first media application, lock a third portion of the first media project corresponding to the second portion of the second media project to be read-only while a fourth portion of the first media project corresponding to the first portion of the second media project is editable.

2. The method of claim 1 wherein managing the set of contextual rules includes at least one of:
   receiving customized rules;
   utilizing predefined rules; and
   generating new rules based on at least one of historic project data, current project status, and data external to the first media project and second media project.

3. The method of claim 2 wherein generating new rules based on at least one of historic project data, current project status, and external data includes applying machine learning.

4. The method of claim 1 wherein operating the second project adapter module to convert the generalized project into the second project format includes operating the second project adapter module to generate the second media project by:
   receiving contextual rules of the set of contextual rules from the synchronization service; and
   applying the received contextual rules to the generalized project to generate the second media project.

5. The method of claim 4 wherein applying the received contextual rules to the generalized project to generate the second media project includes generating the second media project to include additional information not present in the first media project.

6. The method of claim 5 wherein generating the second media project to include additional information not present in the first media project includes one of:
   including a different type of media object in the second media project than a media object included in a same context in the first media project;
   placing a placeholder media object in the second media project in a same context of a media effect in the first media project; and
   referencing a different media asset in the second media project than a media asset included in a same context in the first media project.

7. The method of claim 1 wherein:
   operating the synchronization service to manage the set of contextual rules includes operating a transcoder to convert a first media asset referenced by the first media project from a first media format supported by the first media application to a second media format supported by the second media application, thereby generating a second media asset; and
   operating the second project adapter module to convert the generalized project into the second project format includes selectively performing, with reference to the set of contextual rules, one of:
      referencing the second media asset in the second media project instead of the first media asset referenced in the first media project; and
      referencing both the first media asset and the second media asset in the second media project in a same context as the first media project references the first media asset.

8. The method of claim 1 wherein operating the synchronization service to lock a first portion of the second media project to be read-only and to lock a third portion of the first media project to be read-only includes selectively determining which portions are to be read-only depending both on which user is accessing each portion and on the contextual rules.

9. The method of claim 1 wherein the method further comprises operating the synchronization service to detect that the second portion of the second media project has been edited, and, in response:
   operating the second project adapter module to convert, with reference to the set of contextual rules, the edited second portion into the generalized project format, thereby generating an updated portion;

inserting the updated portion into the generalized project, thereby generating an updated generalized project; and operating the first project adapter module to convert, with reference to the set of contextual rules, the updated generalized project into the first project format, thereby generating an updated first media project.

10. The method of claim 9 wherein operating the synchronization service to detect that the second portion of the second media project has been edited includes receiving a notification from a notification service.

11. The method of claim 1 wherein the method further comprises operating the synchronization service to detect that both the second portion of the second media project and the fourth portion of the first media project have been edited, and, in response:

operating the second project adapter module to convert, with reference to the set of contextual rules, the edited second portion into the generalized project format, thereby generating a first updated portion;

operating the first project adapter module to convert, with reference to the set of contextual rules, the edited fourth portion into the generalized project format, thereby generating a second updated portion;

inserting the first updated portion and the second updated portion into the generalized project, thereby generating an updated generalized project;

operating the first project adapter module to convert, with reference to the set of contextual rules, the updated generalized project into the first project format, thereby generating an updated first media project; and operating the second project adapter module to convert, with reference to the set of contextual rules, the updated generalized project into the second project format, thereby generating an updated second media project.

12. The method of claim 1 wherein the method further comprises operating the synchronization service to:

identify media assets referenced from the first media project that are stored in locations inaccessible to the second media application;

in response to identifying such media assets, request restoration of the identified media assets to a location accessible to the second media application; and update references within the second media project to point to the restored media assets.

13. A system for synchronizing project data between media applications, the system comprising:

a network;

a set of one or more computing devices configured to:

operate a first project adapter module to convert a first media project generated by a first media application from a first project format into a generalized project format, thereby generating a generalized project;

operate a synchronization service to manage a set of contextual rules;

operate a second project adapter module to convert, with reference to the contextual rules, the generalized project into a second project format used by a second media application, thereby generating a second media project;

view the second media project using the second media application;

using techniques appropriate for the second media application, lock a first portion of the second media project to be read-only while a second portion of the second media project is editable; and using techniques appropriate for the first media application, lock a third portion of the first media project corresponding to the second portion of the second media project to be read-only while a fourth portion of the first media project corresponding to the first portion of the second media project is editable.

14. The system of claim 13 wherein managing the set of contextual rules includes at least one of:

receiving customized rules;

utilizing predefined rules; and generating new rules based on at least one of historic project data, current project status, and data external to the first media project and second media project.

15. The system of claim 13 wherein operating the second project adapter module to convert the generalized project into the second project format includes operating the second project adapter module to generate the second media project by:

receiving contextual rules of the set of contextual rules from the synchronization service; and applying the received contextual rules to the generalized project to generate the second media project.

16. A computer program product comprising a non-transitory computer-readable storage medium storing instructions, which, when executed by a set of one or more computing devices, cause the set of one or more computing devices to synchronize project data between media applications by:

operating a first project adapter module to convert a first media project generated by a first media application from a first project format into a generalized project format, thereby generating a generalized project;

operating a synchronization service to manage a set of contextual rules;

operating a second project adapter module to convert, with reference to the set of contextual rules, the generalized project into a second project format used by a second media application, thereby generating a second media project;

viewing the second media project using the second media application; and operating the synchronization service to:

using techniques appropriate for the second media application, lock a first portion of the second media project to be read-only while a second portion of the second media project is editable; and using techniques appropriate for the first media application, lock a third portion of the first media project corresponding to the second portion of the second media project to be read-only while a fourth portion of the first media project corresponding to the first portion of the second media project is editable.

\* \* \* \* \*